US012614676B2

(12) United States Patent
Koo et al.

(10) Patent No.: US 12,614,676 B2
(45) Date of Patent: Apr. 28, 2026

(54) MULTILAYER ELECTRONIC COMPONENT

(71) Applicant: SAMSUNG ELECTRO-MECHANICS CO., LTD., Suwon-si (KR)

(72) Inventors: Kun Hoi Koo, Suwon-si (KR); Soung Jin Kim, Suwon-si (KR); Young Soo Yi, Suwon-si (KR); San Kyeong, Suwon-si (KR); Yun Hee Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 318 days.

(21) Appl. No.: 18/425,336

(22) Filed: Jan. 29, 2024

(65) Prior Publication Data

US 2024/0274363 A1 Aug. 15, 2024

(30) Foreign Application Priority Data

Feb. 9, 2023 (KR) ........................ 10-2023-0017529

(51) Int. Cl.
*H01G 4/30* (2006.01)
*C04B 35/64* (2006.01)
(Continued)

(52) U.S. Cl.
CPC .............. *H01G 4/30* (2013.01); *C04B 35/64* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 4/008; H01G 4/012; H01G 4/12; H01G 4/2325; C04B 35/64
See application file for complete search history.

(56) References Cited

U.S. PATENT DOCUMENTS 9,520,237 B2 12/2016 Nishisaka
2006/0232910 A1* 10/2006 Megherhi ................ H01G 4/30
361/321.4
(Continued)

FOREIGN PATENT DOCUMENTS

EP 0395018 B1 7/1995
JP H11-067588 A 3/1999
(Continued)

OTHER PUBLICATIONS

Office Action dated Dec. 23, 2024, issued in corresponding Japanese Patent Application No. 2024-011005 with an English translation.
(Continued)

*Primary Examiner* — Michael P McFadden
(74) *Attorney, Agent, or Firm* — MORGAN, LEWIS & BOCKIUS LLP

(57) ABSTRACT

A multilayer electronic component includes: a body including a dielectric layer and first and second internal electrodes alternately disposed in a first direction with the dielectric layer interposed therebetween, a first external electrode and including a first alloy layer connected to the first internal electrode; and a second external electrode and including a second alloy layer connected to the second internal electrode, wherein the first and second alloy layers include alloys including Cu, Ni and Al, and a molar content of Ni included in the first alloy layer is greater than a molar content of Al, and a molar content of Cu is greater than the molar content of Ni.

14 Claims, 4 Drawing Sheets

(51) Int. Cl.

| | |
|---|---|
| *H01G 4/008* | (2006.01) |
| *H01G 4/012* | (2006.01) |
| *H01G 4/12* | (2006.01) |
| *H01G 4/232* | (2006.01) |

(56) References Cited

U.S. PATENT DOCUMENTS

| | | | |
|---|---|---|---|
| 2008/0063881 A1* | 3/2008 | Symes | C04B 35/638 |
| | | | 428/457 |
| 2013/0329339 A1* | 12/2013 | Masuda | H01G 9/048 |
| | | | 361/311 |
| 2014/0063684 A1 | 3/2014 | Lee et al. | |
| 2015/0016018 A1* | 1/2015 | Onishi | H10N 30/872 |
| | | | 310/365 |
| 2016/0071647 A1 | 3/2016 | Nishisaka et al. | |
| 2016/0268046 A1* | 9/2016 | Nishisaka | H01G 4/232 |
| 2017/0018362 A1 | 1/2017 | Nishisaka et al. | |
| 2018/0096791 A1 | 4/2018 | Nishisaka et al. | |
| 2019/0371525 A1 | 12/2019 | Zaima et al. | |

FOREIGN PATENT DOCUMENTS

| | | | |
|---|---|---|---|
| JP | 2002-100526 | A | 4/2002 |
| JP | 2008-042068 | A | 2/2008 |
| JP | 2015-035581 | A | 2/2015 |
| JP | 2016-171310 | A | 9/2016 |
| JP | 2017-028253 | A | 2/2017 |
| JP | 2018-060875 | A | 4/2018 |
| JP | 6787364 | B2 | 11/2020 |
| JP | 2021-010034 | A | 1/2021 |
| JP | 2021-100020 | A | 7/2021 |
| KR | 10-2014-0030611 | A | 3/2014 |
| KR | 10-2016-0030372 | A | 3/2016 |
| KR | 10-2021-0028631 | A | 3/2021 |

OTHER PUBLICATIONS

Extended European Search Report dated Dec. 16, 2024, issued in corresponding European Patent Application No. 24153957.6.
Office Action issued in corresponding Japanese Patent Application No. 2024-011005 on May 7, 2025, with English translation.

* cited by examiner

FIRST
DIRECTION

SECOND
DIRECTION

I–I'

FIRST
DIRECTION

THIRD
DIRECTION

II–II'

FIRST
DIRECTION

SECOND
DIRECTION

K1

MULTILAYER ELECTRONIC COMPONENT

CROSS-REFERENCE TO RELATED APPLICATION(S)

This application claims benefit of priority to Korean Patent Application No. 10-2023-0017529 filed on Feb. 9, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser that is mounted on the printed circuit boards of various electronic products such as imaging devices including a liquid crystal display (LCD) and a plasma display panel (PDP), computers, smartphones, and mobile phones, and serves to charge or discharge electricity therein or therefrom.

Since the multilayer ceramic capacitor has the advantages of being compact, having high capacity and being easy to install, it may be used as a component of various electronic devices. As various electronic devices such as computers and mobile devices have been miniaturized and have become high-powered, there is an increasing demand for miniaturization and high capacitance for multilayer ceramic capacitors.

In general, Ni of an internal electrode and Cu of an external electrode may be mutually diffused during a sintering process to form a Ni—Cu alloy layer. As the Ni—Cu alloy layer may improve a connection between the internal electrode and the external electrode, it may serve to improve electrical properties, such as improvements in the capacitance of the multilayer ceramic capacitor.

However, in the process of forming the Ni—Cu alloy layer, since a rate at which Cu diffuses into Ni is even faster than a rate at which Ni diffuses into Cu, a large amount of Cu may diffuse toward the internal electrode to lead to an expansion of the volume of the internal electrode, so that there may be a risk of radiating cracks.

Specifically, when the number of stacks is increased by thinning a dielectric layer and the internal electrode in order to achieve miniaturization and high capacitance of the multilayer ceramic capacitor, high stress may be applied to the thin dielectric layer and the thin internal electrode, which may be more vulnerable to the radiating cracks.

Accordingly, there is a need to develop a multilayer ceramic capacitor configured to suppress the radiating cracks while improving the connection between the internal electrode and the external electrode.

SUMMARY

An aspect of the present disclosure is to improve a connection between an internal electrode and an external electrode.

Another aspect of the present disclosure is to suppress radiating cracks generated in a body of a multilayer electronic component.

However, the aspects of the present disclosure are not limited to the above-described contents, and may be more easily understood in the process of describing specific embodiments of the present disclosure.

According to some aspects of the present disclosure, a multilayer electronic component includes: a body including a dielectric layer and first and second internal electrodes alternately disposed in a first direction with the dielectric layer interposed therebetween, and including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; and a first external electrode disposed on the third surface and including a first alloy layer connected to the first internal electrode; and a second external electrode disposed on the fourth surface and including a second alloy layer connected to the second internal electrode, wherein the first and second alloy layers include alloys including Cu, Ni, and Al, and a molar content of Ni included in the first alloy layer is greater than a molar content of Al included in the first alloy layer, and a molar content of Cu included in the first alloy layer is greater than the molar content of Ni included in the first alloy layer.

According to another aspects of the present disclosure, a multilayer electronic component includes: a body including a dielectric layer and first and second internal electrodes alternately disposed in a first direction with the dielectric layer interposed therebetween, and including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; a first external electrode disposed on the third surface and including a first alloy layer in contact with the first internal electrode inside the body; and a second external electrode disposed on the fourth surface and including a second alloy layer in contact with the second internal electrode inside the body, wherein the first and second alloy layers include alloys including Cu, Ni and Al, and a region in which the first internal electrode and the first alloy layer are in contact with each other is within 5 μm in the second direction from the third surface.

As one of various effects of the present disclosure, a connection between an internal electrode and an external electrode may be improved.

As one of various effects of the present disclosure, radiating cracks generated in a body of a multilayer electronic component may be suppressed.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
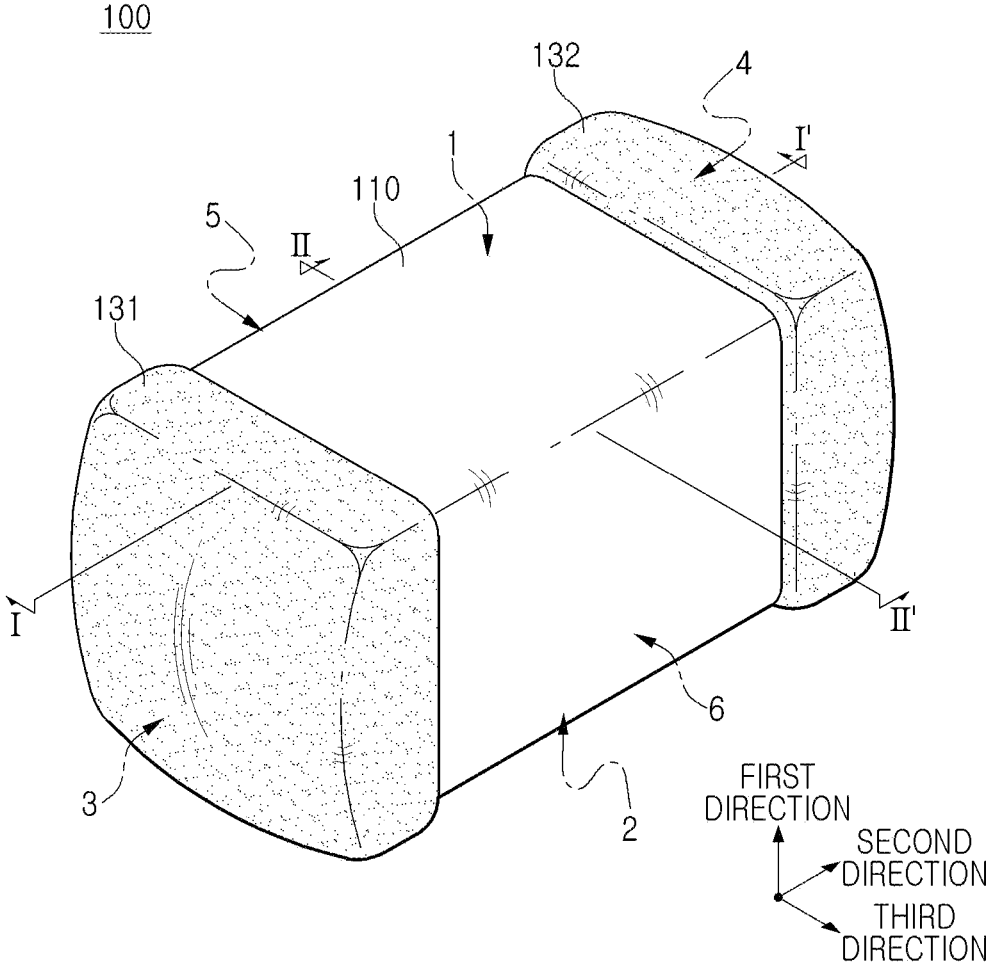
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. Furthermore, the example embodiments disclosed herein are provided for those skilled in the art to better explain the present disclosure. In the drawings, the shapes and dimensions of elements may be exaggerated for clarity, and the same reference numerals will be used throughout to designate the same or like elements.

Furthermore, in order to clearly describe the present disclosure in the drawings, the contents unrelated to the description are omitted, and since sizes and thicknesses of each component illustrated in the drawings are arbitrarily shown for convenience of description, the present disclosure is not limited thereto. Furthermore, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
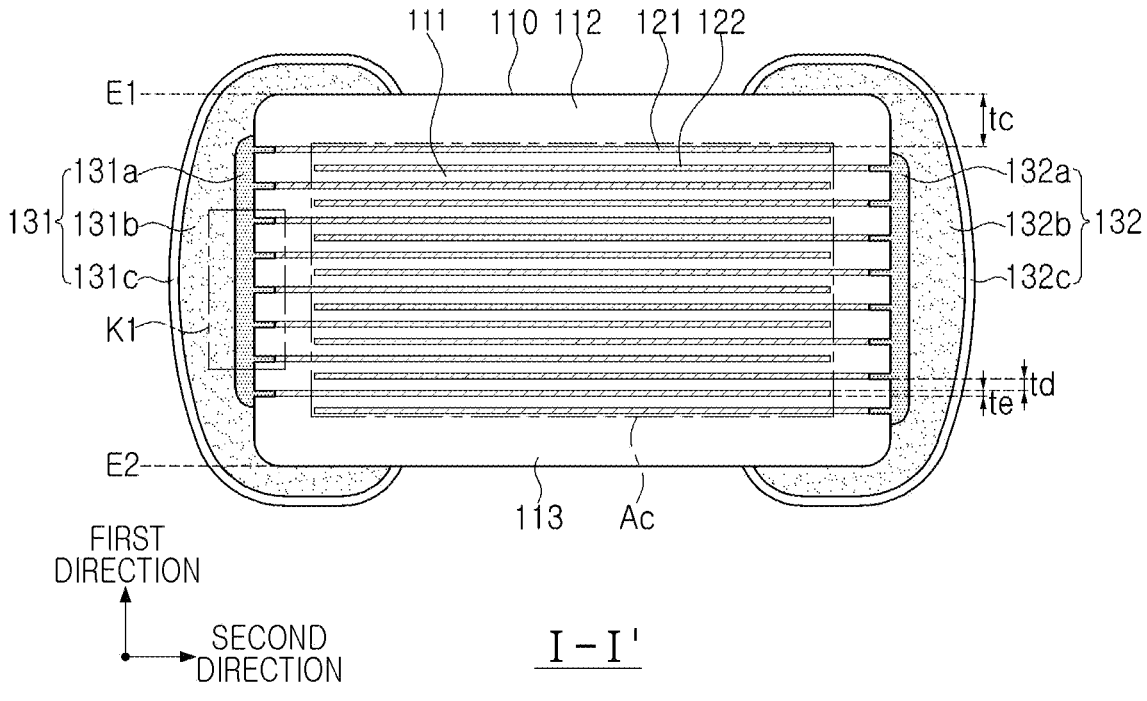
FIG. 2 is a schematic cross-sectional view taken along line I-I' of FIG. 1.

FIG. 2 is a schematic cross-sectional view taken along line I-I' of FIG. 1.

Figure 3:
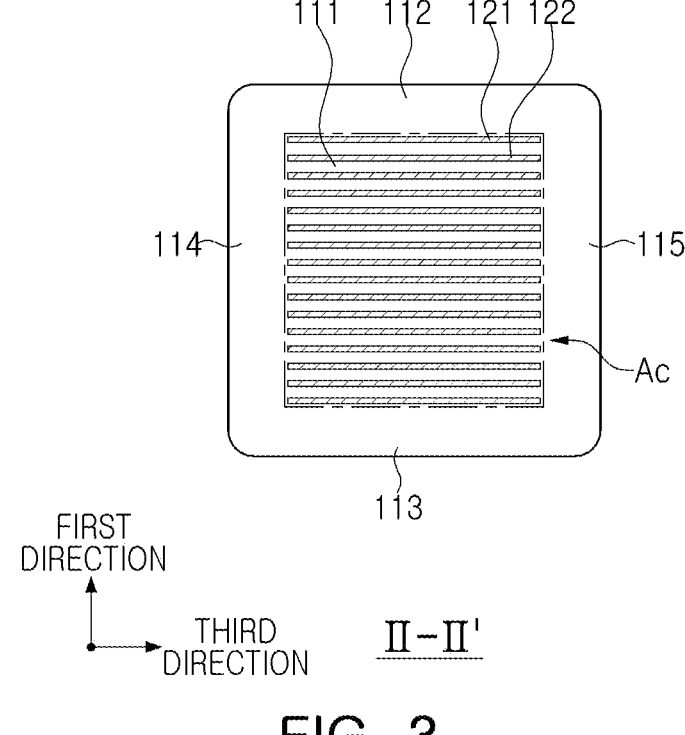
FIG. 3 is a schematic cross-sectional view taken along line II-II' of FIG. 1.

FIG. 3 is a schematic cross-sectional view taken along line II-II' of FIG. 1.

Figure 4:
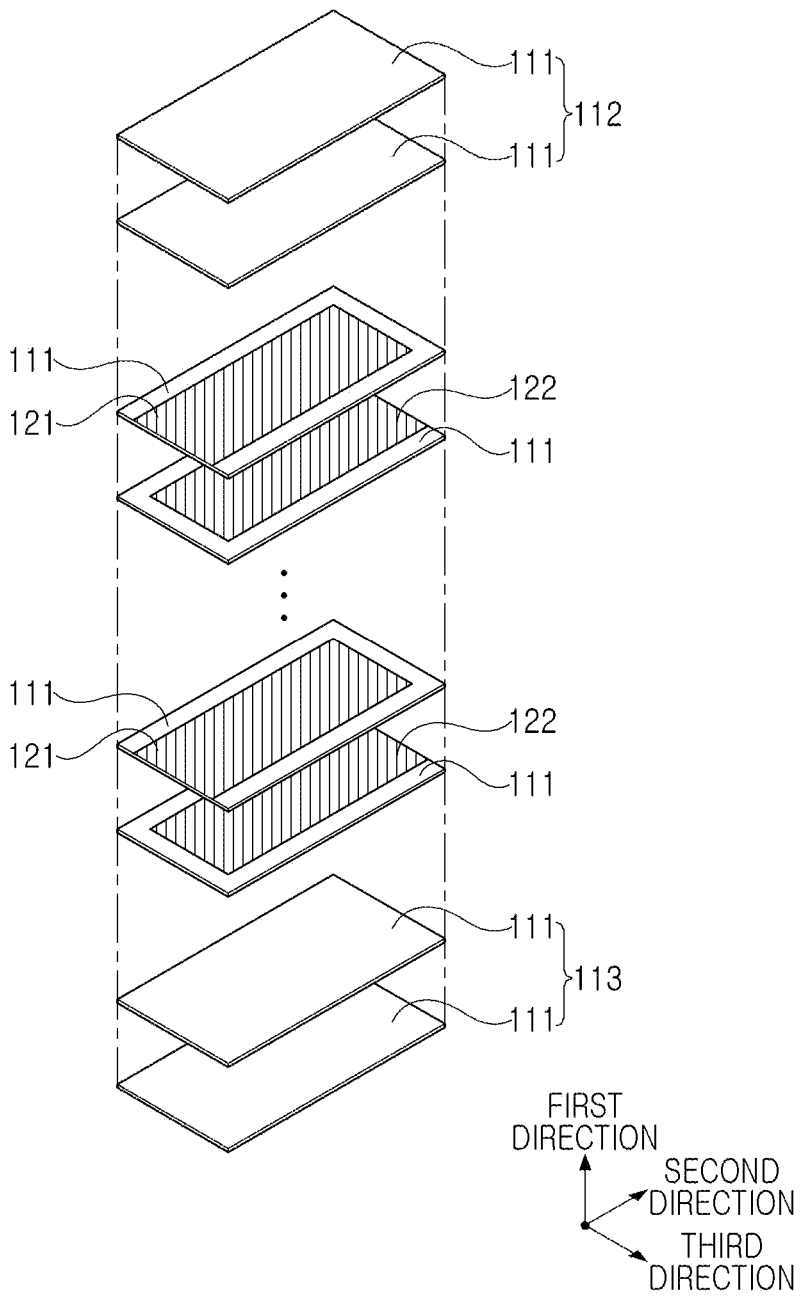
FIG. 4 is an exploded perspective view schematically illustrating a body of FIG. 1.

FIG. 4 is an exploded perspective view schematically illustrating a body of FIG. 1.

Figure 5:
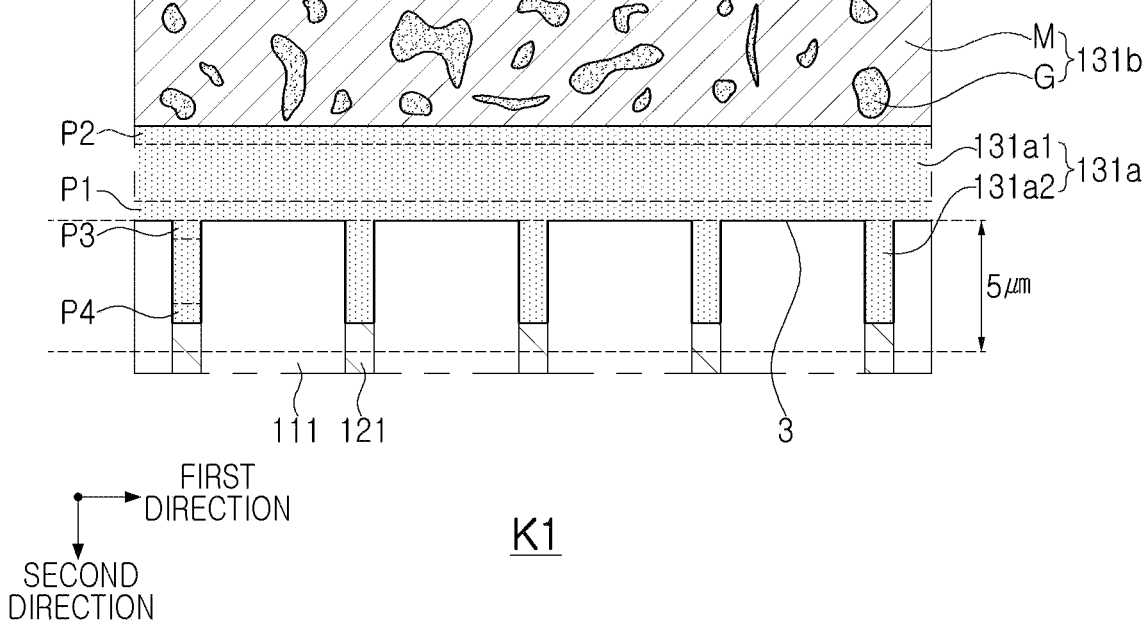
FIG. 5 is an enlarged view of region K1 of FIG. 2.

FIG. 5 is an enlarged view of region K1 of FIG. 2.

Hereinafter, a multilayer electronic component 100 according to some example embodiments of the present disclosure will be described in detail with reference to the drawings. Furthermore, a multilayer ceramic capacitor (hereinafter referred to as 'MLCC') is described as an example of a multilayer electronic component, but the present disclosure is not limited thereto, and may be applied to various multilayer electronic components, such as inductors, piezoelectric devices, varistors, or thermistors.

The multilayer electronic component 100 according to some example embodiments of the present disclosure may include a dielectric layer 111 and first and second internal electrodes 121 and 122 alternately disposed in the first direction with the dielectric layer interposed therebetween, and may include a body 110 including a first surface 1 and a second surface 2 opposing each other in the first direction, a third surface 3 and a fourth surface 4 connected to the first surface and the second surface and opposing each other in the second direction, and a fifth surface 5 and a sixth surface 6 connected to the first to fourth surfaces and opposing each other in the third direction, a first external electrode 131 including a first alloy layer 131a disposed on the third surface and connected to the first internal electrode, and a second external electrode 132 disposed on the fourth surface and including a second alloy layer 132a connected to the second internal electrode, and the first and second alloy layers include alloys including Cu, Ni and Al, a molar content of Ni included in the first alloy layer may be greater than a molar content of Al in the first alloy layer, and a molar content of Cu in the first alloy layer may be greater than the molar content of Ni in the first alloy layer.

As described above, in the case of conventional general multilayer ceramic capacitors, Ni of an internal electrode and Cu of an external electrode may mutually diffuse during a sintering process. However, since a rate at which Cu diffuses into Ni is even faster than a rate at which Ni diffuses into Cu, a large amount of Cu may diffuse toward the internal electrode which may lead to an expansion of the volume of the internal electrode, so that there may be a risk of radiating cracks occurring in the body.

On the other hand, according to some example embodiments of the present disclosure, the external electrodes 131 and 132 may be connected to the internal electrodes 121 and 122, respectively. The connection between the internal electrodes 121 and 122 and the external electrodes 131 and 132, respectively, may be secured by including the alloy layers 131a and 132a including alloys including Cu, Ni and Al, and simultaneously, it is possible to suppress an occurrence of radiating cracks in the body 110 by allowing Al to reduce a difference in diffusion rates between Cu and Ni. Furthermore, since Al included in the alloy layers 131a and 132a has the properties of absorbing water vapor, it may be possible to improve moisture resistance reliability of the multilayer electronic component 100 by suppressing external moisture from penetrating into the body 110.

Specifically, in the case of the multilayer electronic component 100 according to some example embodiments of the present disclosure, as the molar content of Ni included in the alloy layers 131a or 132a is greater than that of Al in the alloy layers 131a or 132a, and the molar content of Cu in the alloy layers 131a or 132a is greater than that of Ni in the alloy layers 131a or 132a, a connection between the internal electrodes 121 and 122 and the external electrodes 131 and 132 may be improved, and a suppression effect of the radiating cracks may be more remarkably improved.

Hereinafter, each component included in the multilayer electronic component 100 according to an example embodiment of the present disclosure will be described in more detail.

There is no particular limitation on a specific shape of the body 110, but as illustrated, the body 110 may have a hexahedral shape or a shape similar thereto. Due to the shrinkage of ceramic powder particles included in the body 110 during a sintering process or the polishing of corners, the body 110 is not a hexahedral shape with a complete straight line, but may have a substantially hexahedral shape.

The body 110 may have the first surface 1 and the second surface 2 opposing each other in the first direction, the third surface 3 and the fourth surface 4 connected to the first surface 1 and the second surfaced 2 and opposing each other in the second direction, and the fifth surface 5 and the sixth surface 6 connected to the first to fourth surfaces 1, 2, 3 and 4 and opposing each other in the third direction.

In the body 110, the dielectric layer 111 and the internal electrodes 121 and 122 may be alternately stacked. Since a plurality of dielectric layers 111 forming the body 110 are in a sintered state, a boundary between adjacent dielectric layers 111 may be integrated to the extent that the boundary may be difficult to identify without using a scanning electron microscope (SEM).

The dielectric layer 111 may be formed by manufacturing a ceramic slurry including ceramic powder particles, an organic solvent, and a binder, preparing a ceramic green sheet by applying and drying the slurry on a carrier film, and then sintering the ceramic green sheet. The ceramic powder particles are not particularly limited as long as they can obtain sufficient capacitance, but for example, barium titanate-based materials, lead composite perovskite-based materials, or strontium titanate-based materials can be used for the ceramic powder particles, and examples of the ceramic powder particles may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ which is formed by partially employing calcium (Ca) and zirconium (Zr) in $BaTiO_3$, or $Ba(Ti_{1-y}Zr_y)O_3$ $(0<y<1)$.

An average thickness td of the dielectric layer 111 is not particularly limited. However, when the dielectric layer 111 is formed to be thin to achieve miniaturization and high capacitance of the multilayer electronic component 100, the dielectric layer 111 may be vulnerable to stress generated when a voltage is applied, which may easily generate radiating cracks in the body 110. On the other hand, in the case of the multilayer electronic component according to some example embodiments of the present disclosure, the alloy layers 131a and 132a may include alloys including Cu, Ni and Al, the molar content of Ni including in the alloy layers 131a or 132a may be greater than that of Al in the alloy layers 131a or 132a, and the molar content of Cu in the alloy layers 131a or 132a is greater than that of Ni in the alloy layers 131a or 132a. Accordingly, even when the average thickness td of the dielectric layer 111 is 0.4 μm or less, reliability of the multilayer electronic component may be secured.

Here, the average thickness td of the dielectric layer 111 refers to a size in the first direction of the dielectric layer 111 disposed between the internal electrodes 121 and 122. The average thickness of the dielectric layer 111 may be measured by scanning an image of the first and second directional cross-sections of the body 110 with the scanning electron microscope (SEM) of 10,000× magnification. More specifically, an average value may be measured by measuring the thickness at a plurality of points of one dielectric layer 111, for example, 30 points which are spaced apart from each other at equal intervals in the second direction. The 30 points spaced apart from each other at equal intervals may be designated in a capacitance formation portion Ac to be described below. In addition, when the average value is measured by extending an average value measurement up to 10 dielectric layers 111, the average thickness of the dielectric layer 111 may be further generalized.

The internal electrodes 121 and 122 may be alternately disposed with the dielectric layer 111, and for example, a pair of electrodes with different polarities, i.e., the first internal electrode 121 and the second internal electrode 122, may be alternately disposed with the dielectric layer 111 interposed therebetween. The first internal electrode 121 and the second internal electrode 122 may be electrically separated from each other by the dielectric layer 111 disposed therebetween. The first internal electrode 121 may be connected to the first external electrode 131 at the third surface 3, and the second internal electrode 122 may be connected to the second external electrode 132 at the fourth surface 4.

The internal electrodes 121 and 122 may include at least one conduct metal selected from the group consisting of nickel (Ni), copper (Cu), palladium (Pd), silver (Ag), gold (Au), platinum (Pt), tin (Sn), tungsten (W), titanium (Ti), and alloys thereof, and more preferably, may include Ni.

The internal electrodes 121 and 122 may be formed by applying a conductive paste for internal electrodes including a conductive metal by a predetermined thickness on a ceramic green sheet and sintering the conductive paste. A printing method for the conductive paste for internal electrodes may be a screen-printing method or a gravure printing method, but the present disclosure is not limited thereto.

An average thickness te of the internal electrodes 121 and 122 is not particularly limited. Meanwhile, as described above, in the case of the multilayer electronic component according to some example embodiments of the present disclosure, the alloy layers 131a and 132a may include Cu, Ni and Al, the molar content of Ni included in the alloy layers 131a and 132a may be greater than that of Al included in the alloy layers 131a and 132a, and the molar content of Cu included in the alloy layers 131a and 132a is greater than that of Ni included in the alloy layers 131a and 132a. Accordingly, even when the average thickness te of the internal electrodes 121 and 122 is 0.4 μm or less, reliability of the multilayer electronic component may be secured.

The average thickness te of the internal electrodes 121 and 122 denotes a size of the internal electrodes 121 and 122 in the first direction. Here, the average thickness of the internal electrodes 121 and 122 may be measured by scanning an image of the first and second directional cross sections of the body 110 with a scanning electron microscope (SEM) at 10,000× magnification. More specifically, the average value may be measured by measuring the thickness at a plurality of points of one internal electrode 121 or 122, for example, 30 points which are spaced apart from each other at equal intervals in the second direction. The 30 points spaced apart from each other at equal intervals may be designated in a capacitance formation portion Ac to be described below. In addition, when the average value is measured by extending an average value measurement up to 10 internal electrodes 121 or 122, the average thickness of the internal electrodes 121 or 122 may be further generalized.

The body 110 may include a capacitance formation portion Ac disposed inside the body 110 and having capacitance formed by including first and second internal electrodes 121 and 122 alternately disposed with the dielectric layer 111 interposed therebetween, and a first cover portion 112 and a second cover portion 113 respectively disposed on both cross-sections of the capacitance formation portion Ac opposing each other in the first direction. The cover portions 112 and 113 may basically serve to prevent damage to the internal electrodes due to physical or chemical stress. The cover portions 112 and 113 may have the same configuration as the dielectric layer 111 except that they do not include the internal electrodes.

A thickness tc of the cover portions 112 and 113 need not be particularly limited. However, the average thickness tc of the cover portions 112 and 113 may be 20 μm or less for achieve miniaturization and high capacitance of the multilayer electronic component. Even when the average thickness tc of the cover portions 112 and 113 is 20 μm or less, the alloy layers 131a and 132a may include alloys including Cu, Ni and Al, the molar content of Ni included in the alloy layers 131a and 132a may be greater than that of Al included in the alloy layers 131a and 132a, and the molar content of Cu included in the alloy layers 131a and 132a may be greater than that of Ni included in the alloy layers 131a and 132a, thereby securing the reliability of the multilayer electronic component. Here, the average thickness of the cover portions 112 and 113 denotes an average thickness of each of the first cover portion 112 and the second cover portion 113.

The average thickness of the cover portions 112 and 113 may mean an average size of the cover portions 112 and 113 in the first direction, and may be a value obtained by averaging sizes in the first direction measured at five points spaced apart from each other at equal intervals in the cross-section of the body 110 in the first direction and the second direction.

The body 110 may include a first margin portion 114 and a second margin portion 115 respectively disposed on both cross-sections facing the capacitance formation portion Ac in the third direction. That is, the margin portions 114 and 115 may refer to regions between both ends of the internal electrodes 121 and 122 and boundary surfaces of the body 110 in cross-sections in which the body 110 is cut in the first direction and the third direction.

The margin portions 114 and 115 may include the same material as the dielectric layer 111 except that they do not include the internal electrodes 121 and 122. The margin portions 114 and 115 may basically serve to prevent damage to the internal electrodes 121 and 122 due to physical or chemical stress.

The margin portions 114 and 115 may be formed by applying and firing a conductive paste for an internal electrode except for a position in which the margin portions will be formed on the ceramic green sheet. Alternatively, in order to suppress a step portion caused by the internal electrodes 121 and 122, the internal electrodes 121 and 122 may be stacked and then cut to be connected to the fifth surface 5 and the sixth surface 6 of the body, and then, the margin portions 114 and 115 may be formed by stacking a single dielectric layer or two or more dielectric layers on both cross-sections of the capacitance formation portion Ac opposing each other in the third direction.

An average thickness of the margin portions 114 and 115 need not be particularly limited. However, for achieving miniaturization and high capacitance of the multilayer electronic component, the average thickness of the margin portions 114 and 115 may be 20 μm or less. As described above, even when the average thickness of the margin portions 114 and 115 is 20 μm or less, the alloy layers 131a and 132a include alloys including Cu, Ni and Al, the molar content of Ni included in the alloy layers 131a and 132a may be greater than that of Al included in the alloy layers 131a and 132a, and the molar content of Cu included in the alloy layers 131a and 132a may be greater than that of Ni included in the alloy layers 131a and 132a, thereby ensuring reliability of the multilayer electronic component. Here, the average thickness of the margin portions 114 and 115 denote an average thickness of each of the first machining portion 114 and the second machining portion 115.

The average thickness of the margin portions 114 and 115 may denote an average size of the margin portions 114 and 115 in the third direction, and may be a value obtained by averaging sizes in the third direction measured at five points spaced apart from each other at equal intervals in the cross-sections of the body 110 in first direction and the third direction.

The external electrodes 131 and 132 may be disposed on the third surface 3 and the fourth surface and 4 of the body 110, and may extend over a portion of the first surface, the second surface, the fifth surface, and the sixth surface. Furthermore, the external electrodes 131 and 132 may include a first external electrode 131 connected to the first internal electrode 121 and a second external electrode 132 connected to the second internal electrode 122.

The external electrodes 131 and 132 may respectively include alloy layers 131a and 132a connected to the internal electrodes 121 and 122, and electrode layers 131b and 132b respectively disposed on the alloy layers 131a and 132a. That is, the first external electrode 131 may include a first alloy layer 131a disposed on the third surface 3 and connected to the first internal electrode 121, and a first electrode layer 131b disposed on the first alloy layer, and the second external electrode 132 may include a second alloy layer 132a disposed on the fourth surface 4 and connected to the second internal electrode 122 and a second electrode layer 132b disposed on the second alloy layer. As illustrated in FIG. 2, the first alloy layer 131a may be in contact with the first internal electrode 121 in the body 110, and the second alloy layer 132a may be in contact with the second internal electrode 122 in the body 110.

Furthermore, the first external electrode 131 may include a first plating layer 131c disposed on the first electrode layer, and the second external electrode 132 may include a second plating layer 132c disposed on the second electrode layer.

Although a structure of the multilayer electronic component 100 having two external electrodes 131 and 132 is described in the drawings, the present disclosure is not limited thereto, and the number or shape of the external electrodes 131 and 132 may be changed according to the shape or other purpose of the internal electrodes 121 and 122.

The first and second electrode layers 131b and 132b may extend from the first and second alloy layers 131a and 132a onto at least a portion of the first surface 1 and the second surface 2. Furthermore, the first and second electrode layers 131b and 132b may extend from the first and second alloy layers 131a and 132a to at least a portion of the fifth surface 5 and the sixth surface 6.

The first and second electrode layers 131b and 132b may include metal and glass. For example, referring to FIG. 5, a metal M included in the first electrode layer 131b may serve to ensure an electrical connection with the first alloy layer 131a, and a glass G included in the first electrode layer 131b may serve to secure bonding force between the body 110 and the external electrodes 131 and 132.

The metal M included in the first and second electrode layers 131b and 132b may be selected from the group consisting of copper (Cu), nickel (Ni), palladium (Pd), platinum (Pt), gold (Au), silver (Ag), lead (Pb), and alloys thereof, and more preferably, may include Cu.

Each of the alloy layers 131a and 132a may include alloys including Cu, Ni and Al. Cu included in the alloy layers 131a and 132a may be derived from the electrode layers 131b and 132b, and Ni included in the alloy layers 131a and 132a may be derived from the internal electrodes 121 and 122. That is, the alloy layers 131a and 132a may be formed by mutually diffusing Cu included in the electrode layers 131b and 132b and Ni included in the internal electrodes 121 and 122 during a sintering process of the electrode layers 131b and 132b. The alloy layers 131a and 132a may basically serve to improve the connection between the internal electrodes 121 and 122 and the external electrodes 131 and 132, thereby improving electrical characteristics of the multilayer electronic component.

On the other hand, due to a difference in diffusion rates between Cu and Ni, the volume of the internal electrodes 121 and 122 may be expanded to cause the radiating cracks to occur in the body 110, but in the case of a multilayer electronic component according to some example embodiments of the present disclosure, alloys included in the alloy layers 131a and 132a may include Al to reduce the difference in diffusion rates between Cu and Ni, thus suppressing the occurrence of the radiating cracks in the body 110. Furthermore, since Al included in the alloy layers 131a and 132a has the property of absorbing water vapor, the penetration of external moisture into the body 110 may be suppressed, thereby improving the moisture resistance reliability of the multilayer electronic component 100.

A method of forming the alloy layers 131*a* and 132*a* and the electrode layers 131*b* and 132*b* need not be particularly limited. For example, the electrode layers 131*b* and 132*b* may be formed by dipping the third surface 3 and the fourth surface 4 of the body 110 into a conductive paste containing Cu particles and glass and then sintering the conductive paste. Meanwhile, when Cu particles coated with $Al_2O_3$ are used as Cu particles included in the conductive paste, Cu included in the electrode layers 131*b* and 132*b* and Ni included in the internal electrodes 121 and 122 may be mutually diffused during the sintering process, but Al coated on Cu may reduce a diffusion rate of Cu to reduce a difference in a mutual diffusion rate between Cu and Ni, thereby suppressing the occurrence of the radiating cracks in the body 110.

Furthermore, when the electrode layers 131*b* and 132*b* are sintered, in the process of forming the alloys including Cu, Ni and Al, the alloy layers 131*a* and 132*a* may be formed by pushing glass included in the electrode layers 131*b* and 132*b*. Accordingly, in an example embodiment, the first and second alloy layers 131*a* and 132*a* may not include glass. Since the alloy layers 131*a* and 132*a* do not include glass, the glass may be prevented from interfering with a contact between the internal electrodes 121 and 122 and the alloy layers 131*a* and 132*a*, thereby more effectively improving the connection between the internal electrodes 121 and 122 and the external electrodes 131 and 132.

In some example embodiments, the first and second alloy layers 131*a* and 132*a* may be disposed between an extension line E1 of the first surface and an extension line E2 of the second surface. Here, the extension line of each surface may denote a line extending from a flat portion of each surface. Since the alloy layers 131*a* and 132*a* are formed by mutually diffusing Cu and Al of the electrode layers 131*b* and 132*b* and Ni of the internal electrodes 121 and 122 during the sintering process, the first and second alloy layers 131*a* and 132*a* may be disposed between the extension line E1 of the first surface and the extension line E2 of the second surface, and may not extend onto the first surface 1 and/or the second surface 2 of the body 110.

Hereinafter, the first alloy layer 131*a* will be described in more detail with reference to FIG. 5. Meanwhile, the first alloy layer 131*a* merely differs from the second alloy layer 132*a* in that the first alloy layer 131*a* is connected to the first internal electrode 121, and the second alloy layer 132*a* is connected to the second internal electrode, and the first alloy layer 131*a* and the second alloy layer 132*a* have similar configurations, and accordingly, the description of the first alloy layer 131*a* below may be considered to include the description of the second alloy layer 132*a*.

According to an example embodiment of the present disclosure, since a rate at which Cu diffuses into Ni is even faster than a rate at which Ni diffuses into Cu, a molar content of Cu included in the first alloy layer 131*a* may be greater than a molar content of Ni. On the other hand, since Ni has a property that oxidizes more easily than Cu, when the molar content of Ni included in the first alloy layer 131*a* is greater than the molar content of Cu, the connection between the first internal electrode 121 and the first external electrode 131 may be reduced due to the formation of a Ni oxide, which may increase equivalent series resistance (ESR).

Furthermore, the molar content of Ni included in the first alloy layer 131*a* may be greater than the molar content of Al. When the molar content of Al included in the first alloy layer

131*a* is greater than that of Ni, the diffusion of Cu and the formation of alloys therethrough may be excessively suppressed, and accordingly, the effect of improving the connection between the internal electrodes and the external electrodes of the present disclosure may be insignificant. That is, in the case of the disclosure, because the first alloy layer 131*a* satisfies the molar content of Cu>the molar content of Ni>the molar content of Al, the effect of improving the connection between the internal electrodes and the external electrodes and suppressing the radiating cracks may be more remarkably enhanced.

In some example embodiments, a molar ratio of an Al content to a total content of Cu, Ni and Al included in the first alloy layer 131*a* may be 0.001 to 0.005. When the molar ratio of the Al content to the total content of Cu, Ni and Al is less than 0.001, the effect of preventing the radiating cracks in the present disclosure may be insignificant. Furthermore, when the molar ratio of the Al content to the total content of Cu, Ni and Al exceeds 0.005, the effect of improving the connection between the internal electrodes and the external electrodes of the present disclosure may be insignificant.

A molar ratio of a Cu content to the total content of Cu, Ni and Al included in the first alloy layer 131*a* is not particularly limited, but may be, for example, 0.504 or more and 0.881 or less. Furthermore, a molar ratio of a Ni content to the total content of Cu, Ni and Al contained in the first alloy layer 131*a* does not need to be particularly limited, but may be, for example, 0.117 or more and 0.495 or less.

The molar content of each of Cu, Ni and Al included in the first alloy layer 131*a* may be measured, for example, by obtaining images captured with a scanning electron microscope (SEM) of the first and second directional cross sections of the multilayer electron component 100 cut in the center of the body the third direction, and then analyzing the components through the image using energy dispersive spectroscopy (EDS).

In some example embodiments, the first alloy layer 131*a* may include a first external alloy layer 131*a*1 continuously disposed on the third surface 3 to form one layer, and a plurality of first internal alloy layers 131*a*2 extending from the first external alloy layer into the body 110 and coming into contact with the first internal electrode 121. The first external alloy layer 131*a*1 may be formed by diffusing Ni of the first internal electrode 121 toward the first electrode layer 131*b*, and the first internal alloy layer 131*a*2 may be formed by diffusing Cu and Al of the first electrode layer 131*b* toward the first internal electrode 121.

Specifically, Al included in the first alloy layer 131*a* may reduce a diffusion rate of Cu to easily diffuse Ni included in the first internal electrode 121 toward the first electrode layer 131*b*, so that the first external alloy layer 131*a*1 may form one layer on the third surface 3.

In an example embodiment, a size of the first internal alloy layer 131*a*2 in the second direction may be 5 μm or less. When the thickness of the first internal alloy layer 131*a*2 in the second direction is 5 μm or less, it may be possible to more effectively prevent the radiating cracks from occurring in the body 110 by causing Cu of the first electrode layer 131*b* to penetrate excessively into the first internal electrode 121.

Meanwhile, the thickness of the first internal alloy layer 131*a*2 in the second direction may denote a distance in the second direction by one end of the first internal alloy layer 131*a*2 coming into contact with the first internal electrode 121 from the third surface 3. When a Scanning Electron Microscopy-Energy-Dispersive X-ray Spectrometry (SEM- EDS) analysis is performed on first directional central regions of the first internal alloy layer 131a2 and the first internal electrode 121, one end of the first internal alloy layer 131a2 in contact with the first internal electrode 121 may be specified as a boundary between a region that satisfies the molar content of Cu>the molar content of Ni>the molar content of Al and a region that does not satisfy the molar content of Cu>the molar content of Ni>the molar content of Al. The SEM-EDS may be performed on first and second directional cross-sections cut in a center of the multilayer electronic component in the third direction, and the cross-sections of the multilayer electronic component may be observed by molding the multilayer electronic component with epoxy and then flattening a surface thereof by ion milling. When the third surface 3 is not flat, a thickness of one first internal alloy layer 131a2 in the second direction may be measured as follow. First, a virtual line connecting the first directional center points of each one end in contact with the first external electrode 131 of two dielectric layers 111, with one first internal alloy layer 131a2 interposed therebetween, can be drawn. Next, A straight line in parallel with the second direction from a first directional center point of one end of the first internal allow layer 131a2 in contact with the first internal electrode 121 toward the virtual line can be drawn. The thickness of one first internal alloy layer 131a2 in the second direction may be defined as a distance between a point in which the virtual line and the straight line meet and the first directional center point of one end of the first internal alloy layer 131a2.

In some example embodiments, a region P1 of the first external alloy layer 131a1 adjacent to the first internal alloy layer may have a molar content of Ni greater than that of a region P2 of the first external alloy layer 131a1 adjacent to an external side of the first external alloy layer. This is because Ni included in the first external alloy layer 131a1 is diffused from the first internal electrode 121.

Furthermore, in some example embodiments, a region P3 of the first internal alloy layer 131a2 adjacent to the first external alloy layer 131a1 may have a molar content of Cu greater than a region P4 of the first internal alloy layer 131a2 adjacent to the first internal electrode 121. This is because Cu included in the first internal alloy layer 131a2 is diffused from the first electrode layer 131b.

The type of the plating layers 131c and 132c is not particularly limited, and may include at least one selected from the group consisting of nickel (Ni), tin (Sn), palladium (Pd), and alloys thereof, or may include a plurality of layers. The plating layers 131c and 132c may include, for example, a nickel (Ni) plating layer or a tin (Sn) plating layer, and may include the nickel (Ni) plating layer and the tin (Sn) plating layer sequentially formed. Furthermore, the plating layers 131c and 132c may include a plurality of nickel (Ni) plating layers and/or a plurality of tin (Sn) plating layers.

Hereinafter, a multilayer electronic component according to another example embodiment of the present disclosure will be described in detail. However, since the same drawings as the example embodiment of the present invention may be applied thereto and the same reference numeral may be applied thereto, the multilayer electronic component according to another example embodiment of the present disclosure will be described with reference to FIGS. 1 to 5. Furthermore, in order to avoid overlapping explanations, descriptions overlapping the multilayer electronic component according to the example embodiment of the present disclosure will be omitted.

A multilayer electronic component 100 according to some example embodiments of the present disclosure may include a dielectric layer 111 and first and second internal electrodes 121 and 122 alternately disposed in the first direction with the dielectric layer interposed therebetween, and may include a body including a first surface 1 and a second surface 2 opposing each other in the first direction, a third surface 3 and a fourth surface 4 connected to the first surface and the second surface and opposing each other in the second direction, and a fifth surface 5 and a sixth surface 6 connected to the first surface to the fourth surface and opposing each other in the third direction, a first external electrode 131 disposed on the third surface and including a first alloy layer 131a in contact with the first internal electrode in the body, and a second external electrode 132 disposed on the fourth surface and including a second alloy layer 132a in contact with the second internal electrode in the body, and the first and second alloy layers 131a and 132a may include alloys including Cu, Ni and Al, and a thickness of the first alloy layer 131a in a region in which the first internal electrode 121 and the first alloy layer 131a are in contact with each other from the third surface in the second direction may be within 5 μm.

As described above, the first and second alloy layers 131a and 132a may include Cu, Ni and Al and may basically serve to improve a connection between the internal electrodes 121 and 122 and the external electrodes 131 and 132, thus improving the electrical characteristics of multilayer electronic components, and the alloys may include Al to reduce a difference in a diffusion rate between Cu and Ni, thus suppressing an occurrence of radiating cracks in the body 110.

Specifically, as an area in which the first internal electrode 121 and the first alloy layer 131a are in contact with each other is within 5 μm from the third surface in the second direction, it may be possible to more effectively prevent the radiating cracks from occurring in the body 110 by causing Cu of the first electrode layer 131b to penetrating excessively into the first internal electrode 121.

Meanwhile, when an SEM-EDS analysis is performed on first directional center regions of the first alloy layer 131a and the first internal electrode 121 disposed inside the body 110, a region in which the first internal electrode 121 and the first alloy layer 131a are in contact with each other may be specified as a boundary between a region that satisfies the molar content of Cu>the molar content of Ni>the molar content of Al and a region that does not satisfy the molar content of Cu>the molar content of Ni>the molar content of Al. The SEM-EDS may be performed on first and second directional cross-sections cut in a center of the multilayer electronic component in the third direction, and the cross-sections of the multilayer electronic component may be observed by molding the multilayer electronic component with epoxy and then flattening a surface thereof by ion milling. Furthermore, when the third surface 3 is not flat, a contact region between the first internal electrode 121 and the first alloy layer 131a within 5 μm from the third surface in the second direction may denote as a distance between a point in which a virtual line and a straight line in parallel with the second direction meet and the first directional center point of a region in which the first internal electrode 121 and the first alloy layer 131a are in contact with each other may be 5 μm or less when drawing the virtual line for connecting the first directional center points of each end in contact with the first external electrodes 131 of two dielectric layers 111 with one first alloy layer 131a disposed in the body 110 interposed therebetween, and drawing a straight line in parallel with the second direction toward the virtual line from the first directional center point of a region in which the first internal electrode 121 and the first alloy layer 131*a* are in contact with each other.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not denote the same example embodiment, and is provided to emphasize and explain different unique characteristics. However, the example embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In addition, expressions such as first and second are used to distinguish one component from another, and do not limit the order and/or importance of the components. In some cases, a first component may be referred to as a second component without departing from the scope of rights, or similarly, the second component may be referred to as the first component.

What is claimed is:

1. A multilayer electronic component comprising:
a body including: a dielectric layer and first and second internal electrodes alternately disposed in a first direction with the dielectric layer interposed therebetween; a first surface and a second surface opposing each other in the first direction; a third surface and a fourth surface connected to the first surface and the second surface and opposing each other in a second direction; and a fifth surface and a sixth surface connected to the first surface to the fourth surface and opposing each other in a third direction;
a first external electrode disposed on the third surface and including a first alloy layer connected to the first internal electrode;
a second external electrode disposed on the fourth surface and including a second alloy layer connected to the second internal electrode,
wherein each of the first and second alloy layers includes alloys including Cu, Ni and Al, and
in each of the first and second alloy layers, a molar content of Ni included is greater than a molar content of Al, and a molar content of Cu is greater than the molar content of Ni.

2. The multilayer electronic component according to claim 1, wherein a molar ratio of an Al content to a total content of Cu, Ni and Al included in each of the first and second alloy layers is 0.001 or more and 0.005 or less.

3. The multilayer electronic component according to claim 1, wherein the first and second alloy layers do not include glass.

4. The multilayer electronic component according to claim 1, wherein the first external electrode further includes a first electrode layer disposed on the first alloy layer, and the second external electrode further includes a second electrode layer disposed on the second alloy layer, and
each of the first and second electrode layers includes a metal and glass.

5. The multilayer electronic component according to claim 4, wherein each of the first and second electrode layers includes Cu.

6. The multilayer electronic component according to claim 4, wherein the first and second electrode layers are disposed to at least a portion of the first surface and the second surface.

7. The multilayer electronic component according to claim 1, wherein the first and second alloy layers are disposed between an extension line of the first surface and an extension line of the second surface,
the extension line of the first surface is a line extending from a flat portion of the first surface, and
the extension line of the second surface is a line extending from a flat portion of the second surface.

8. The multilayer electronic component according to claim 1, wherein each of the first and second alloy layers includes a first external alloy layer continuously disposed on the third surface to form one layer, and a plurality of first internal alloy layers extending from the first external alloy layer into the body, and coming into contact with the first internal electrode.

9. The multilayer electronic component according to claim 8, wherein a thickness of the first internal alloy layer in the second direction is 5 μm or less.

10. The multilayer electronic component according to claim 8, wherein a molar content of Ni in the first external alloy layer is higher in a region adjacent to the first internal alloy layer than in a region adjacent to and in the first external alloy layer.

11. The multilayer electronic component according to claim 8, wherein a molar content of Cu in the first internal alloy layer is higher in a region adjacent to the first external alloy layer than in a region adjacent to the first internal electrode.

12. A multilayer electronic component comprising:
a body including: a dielectric layer and first and second internal electrodes alternately disposed in a first direction with the dielectric layer interposed therebetween; a first surface and a second surface opposing each other in the first direction; a third surface and a fourth surface connected to the first surface and the second surface and opposing each other in a second direction; and a fifth surface and a sixth surface connected to the first surface to the fourth surface and opposing each other in a third direction;
a first external electrode disposed on the third surface and including a first alloy layer in contact with the first internal electrode in the body;
a second external electrode disposed on the fourth surface and including a second alloy layer in contact with the second internal electrode in the body,
wherein each of the first and second alloy layers includes alloys including Cu, Ni and Al, and
a thickness of the first alloy layer from an area where the first internal electrode and the first alloy layer are in contact with each other to the third surface is within 5 μm in the second direction.

13. The multilayer electronic component of claim 12, wherein each of the first and second alloy layers does not include glass.

14. The multilayer electronic component of claim 12, wherein the first and second external electrode include a first electrode layer disposed on the first alloy layer, and the second external electrode includes a second electrode layer disposed on the second alloy layer, and the first and second electrode layers include a metal and glass.

* * * * *